(12) United States Patent
Jeon

(10) Patent No.: US 10,391,726 B2
(45) Date of Patent: Aug. 27, 2019

(54) COMPOSITE LAYER, MANUFACTURING METHOD OF THE SAME, AND COMPOSITE LAYER LAMINATION

(71) Applicant: Hyundai Motor Company, Seoul (KR)

(72) Inventor: Kyu Nam Jeon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 218 days.

(21) Appl. No.: 15/286,702

(22) Filed: Oct. 6, 2016

(65) Prior Publication Data

US 2017/0326822 A1 Nov. 16, 2017

(30) Foreign Application Priority Data

Apr. 25, 2016 (KR) .................. 10-2016-0049908

(51) Int. Cl.
| | | |
|---|---|---|
| *B32B 3/10* | (2006.01) | |
| *B29C 70/54* | (2006.01) | |
| *B29C 53/80* | (2006.01) | |
| *B32B 5/12* | (2006.01) | |
| *B32B 5/26* | (2006.01) | |
| *B65H 81/00* | (2006.01) | |
| *B29C 53/56* | (2006.01) | |
| *B29C 53/84* | (2006.01) | |

(52) U.S. Cl.
CPC .......... *B29C 70/546* (2013.01); *B29C 53/564* (2013.01); *B29C 53/8016* (2013.01); *B29C 70/543* (2013.01); *B32B 5/12* (2013.01); *B32B 5/26* (2013.01); *B65H 81/00* (2013.01); *B29C 53/845* (2013.01); *B65H 2701/31* (2013.01); *B65H 2701/5122* (2013.01)

(58) Field of Classification Search
None
See application file for complete search history.

(56) References Cited

U.S. PATENT DOCUMENTS

2014/0360344 A1   12/2014   Pilpel et al.

FOREIGN PATENT DOCUMENTS

| JP | 2003-165851 A | 6/2003 |
|---|---|---|
| JP | 2004-034592 A | 2/2004 |
| JP | 2005-313455 A | 11/2005 |
| JP | 2007-015203 A | 1/2007 |
| KR | 10-1996-0012439 A | 4/1996 |

(Continued)

OTHER PUBLICATIONS https://www.thirtyhandmadedays.com/organizing-your-embroidery-floss/ pub:2012.*

(Continued)

*Primary Examiner* — Christopher M Polley
(74) *Attorney, Agent, or Firm* — Mintz Levin Cohn Ferris Glovsky and Popeo, P.C.; Peter F. Corless

(57) ABSTRACT

Disclosed are a composite layer, a composite layer lamination and a method of manufacturing a composite layer. The composite layer includes: a resin core formed in a plate-shape and comprising with a plurality of guide protrusions protruding along an edge of the resin core as being spaced apart at a predetermined distance from each other and a plurality of guide notches between the plurality of guide protrusions; and a reinforcing fiber wound around the resin core via the plurality of guide notches functioning as a guide for the reinforcing fiber.

15 Claims, 9 Drawing Sheets

(56) References Cited

FOREIGN PATENT DOCUMENTS

KR     10-2013-0138095 A     12/2013
KR     10-2015-0098268       8/2015

OTHER PUBLICATIONS https://www.edcforums.com/threads/sewing-kits.94242/ PUB: 2011.*
https://www.google.com/search?hi=en&source=Int&tbs=sbi%3AAMhZZitxl-G8N6cluGTZbWs-KsMOJRej9rPShad_1py_1wVxiMIMUeBPwhuUKjbvxrudDzVNvkPHBbDXriHCMDtRDs0yi9CwB0JijQYk2KQKYsj FIJhhKv_1oqAn_1FLaBLWZ-sy3JD-otBfxnoeyqkLAdbrPzu7McJ1NMwx1rF0rL55EiJ484C2BiNGIQw3pRpbHkXj8XNUshGgSQhfxZv7Y_1_1Om1kAPTa-uVjaD2Ox-jfkEk Pub May 2015.*

\* cited by examiner

COMPOSITE LAYER, MANUFACTURING METHOD OF THE SAME, AND COMPOSITE LAYER LAMINATION

CROSS REFERENCE TO RELATED APPLICATION

The present application claims priority to Korean Patent Application No. 10-2016-0049908, filed Apr. 25, 2016, the entire contents of which is incorporated herein for all purposes by this reference.

TECHNICAL FIELD

The present invention relates a composite layer. The composite layer may comprise a resin core and a reinforcing fiber wound around the resin core. The resin core may be melted by heat or a solvent such that the reinforcing fiber may be impregnated in the resin core.

BACKGROUND OF THE INVENTION

Generally, when a composite layer including a reinforcing fiber, such as carbon fiber, is manufactured, layers of a UD (Unidirectional) or a NCF (Non Crimp Fabric) sheet are produced at a predetermined width by a manual process or by using a laminating machine and the layers are laminated. However, this method may cause an increase in the cost of components due to the expensive and time-consuming process.

Moreover, for the manual process of manufacturing composite layers in the related art, maintaining a consistent quality of the composite layers may be difficult.

The foregoing is intended merely to aid in the understanding of the background of the present invention, and is not intended to mean that the present invention falls within the purview of the related art that is already known to those skilled in the art.

SUMMARY OF THE INVENTION

In preferred aspects, the present invention provides a composite layer comprising a resin core and a reinforcement fiber by winding the reinforcing fiber around the resin core.

The term "composite layer" as used herein refers to a material formed in a layer including at least two or more of distinct components. For example, the composite layer in the present application may contain at least a resin composition as a core and reinforcing fibers, which may be mixed or incorporated to form the layer.

In one aspect, the present invention provides a composite layer that may comprise: a resin core comprising a plurality of guide protrusions protruding along an edge of the resin core as being spaced apart at a predetermined distance from each other and a plurality of guide notches formed between the plurality of guide protrusions; and a reinforcing fiber wound around the resin core via the plurality of guide notches that function as a guide for the reinforcing fiber. Preferably, the resin core is formed in a plate-shape, and the resin core may be melted by heat or a solvent.

The term "plate-shape" or "plate-shaped" refers to a three-dimensional shape having a substantially reduced thickness (height) compared to a width and a length, for example, the thickness of the plate-shape object may be less than about 50%, less than about 40%, less than about 30%, less than about 20%, less than about 10%, less than about 5%, less than about 1%, or less than about 0.1% of the length or the width of the object. As such, the three-dimensional shape can be defined with a planar surface and the thickness thereof. The thickness of the plate-shaped object may be uniform or irregular at various positions on the planar surfaces and the three-dimensional shape may have a simple planar surface, for example, square, rectangular or circular, however, the shape of the planar surface may not be particularly limited.

The resin core as used herein refers to a substrate made of a resin, or a polymer resin. For example, the resin core may be injection molded using the resin. Unless otherwise particularly indicated, the resin core may also be indicated as a core.

The reinforcing fiber may be impregnated into the resin core when the resin core is melted by heat or the solvent.

The edge of the resin core may be a square edge formed by one pair of horizontal sides and one pair of vertical sides extending between opposed ends of the one pair of horizontal sides, the guide notches provided in the horizontal sides may be formed at corresponding locations to face each other, and the guide notches provided in the vertical sides may be formed at corresponding locations to face each other.

The reinforcing fiber may include a first reinforcing fiber wound around the resin core from an upper side to a lower side of the resin core in a direction parallel to the horizontal sides.

The reinforcing fiber may further include a second reinforcing fiber wound around the resin core from a first side to a second side of the resin core in a direction parallel to the vertical sides.

The reinforcing fiber may further include a third reinforcing fiber wound around the resin core from a first corner to a second corner of the resin core in a direction parallel to a diagonal line that extends between a third corner and a fourth corner that diagonally face each other.

The reinforcing fiber may further include a fourth reinforcing fiber wound around from the third corner to the fourth corner of the resin core in a direction parallel to a diagonal line that extends between the first corner and the second corner.

The composite layer may further comprise a coupling indentation and a coupling protrusion that are respectively formed on an upper surface and a lower surface of the resin core by indenting the upper surface of the resin core downwardly and by protruding the lower surface of the resin core as much as the upper surface of the resin core.

The coupling indentation and the coupling protrusion may be provided at a location at which the coupling indentation and the coupling protrusion avoid interference with the reinforcing fiber.

In another aspect, the present invention provides a composite layer lamination including a plurality of composite layers laminated in multiple layers. In particular, each of the composite layers may include: a resin core comprising a plurality of guide protrusions protruding along an edge of the core as being spaced apart at a predetermined distance from each other and a plurality of guide notches formed between the plurality of guide protrusions; and a reinforcing fiber wound around the resin core via the plurality of guide notches that function as a guide for the reinforcing fiber.

Preferably, the resin core may be melted by heat or a solvent, such that the reinforcing fibers may be impregnated in the resin core.

The reinforcing fiber of a first composite layer that is a lowest one of the composite layers may be wound in a direction parallel to facing sides of the edge of the resin core, the reinforcing fiber of a second composite layer laminated on the first composite layer may be wound in a direction perpendicular to the reinforcing fiber of the first composite layer, the reinforcing fiber of a third composite layer laminated on the second composite layer may be wound in a direction about 45 degrees from the reinforcing fiber of the second composite layer, and the reinforcing fiber of a fourth composite layer laminated on the third composite layer may be wound in a direction perpendicular to the reinforcing fiber of the third composite layer.

Each of the composite layers may further comprise a coupling indentation and a coupling protrusion that are respectively formed on an upper surface and a lower surface of the resin core by indenting the upper surface of the resin core downwardly and by protruding the lower surface of the resin core as much as the upper surface of the resin core, and the coupling protrusion of an upper laminated composite layer may be coupled with the coupling indentation of a lower laminated composite layer.

In another aspect, the present invention provides a method of manufacturing a composite layer. The method may comprise: preparing a resin core comprising a plurality of guide protrusions protruding along an edge of the resin core as being spaced apart at a predetermined distance from each other and a plurality of guide notches formed between the plurality of guide protrusions; winding a reinforcing fiber firstly around the resin core via the plurality of guide notches in a first direction; and winding the reinforcing fiber secondarily around the resin core in a second direction after rotating the resin core at a predetermined angle, the core having the reinforcing fiber that is wound around the resin core in the first direction. The plurality of the guide notches may function as a guide for the reinforcing fiber.

Preferably, the reinforcing fiber is impregnated in the resin core when the resin core is melted by heat or a solvent.

According to various exemplary composite layer of the present invention as described above, it is possible to manufacture a composite layer by using a reinforcing fiber rather than by using reinforcing fiber sheets such as a UD or a NCF type. Thus, the present invention may reduce time and cost in the process of manufacturing a composite layer. Furthermore, the present invention may manufacture a composite layer reinforced with fibers in several directions by simple change in the winding direction of the reinforcing fibers.

In addition, in the composite layer of the present invention, the reinforcing fiber may be wound over the guide notches defined between the guide protrusions of the resin core, which may be melted by heat or a solvent. As such, the reinforcing fiber may be more efficiently impregnated into the resin core when applying heat or the solvent thereto. Furthermore, the reinforcing fiber may be wound over the guide notches functioning as a guide therefor and thus each composite layer may have a consistent quality.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinbelow, exemplary embodiments of the present invention will be described with reference to the accompanying drawings.

Figure 1:
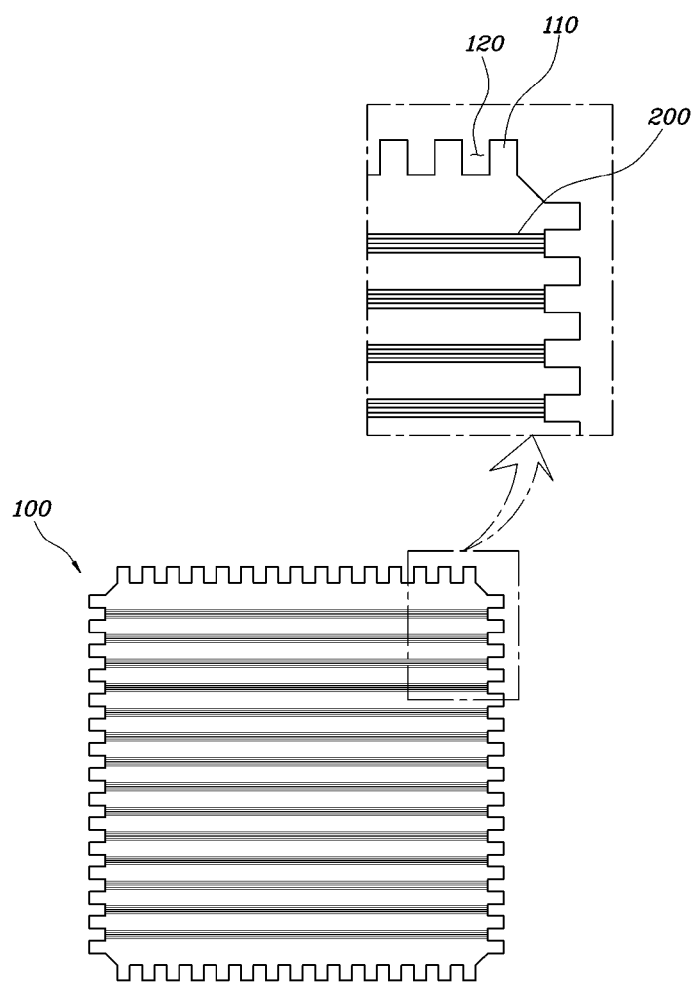
FIG. 1 illustrates an exemplary composite layer according to an exemplary embodiment of the present invention.

As shown in FIG. 1, according to an exemplary embodiment, the present invention provides a composite layer that may include: a resin core 100 comprising a plurality of guide protrusions 110 protruding along an edge of the resin core 100 as being spaced apart at a predetermined distance from each other and a plurality of guide notches 120 formed between the plurality of guide protrusions; and a reinforcing fiber 200 wound around the resin core 100 via the plurality of guide notches 120 that function as a guide for the reinforcing fiber 200.

The resin core may be made of a resin that may be melted by heat or a solvent. Accordingly, the reinforcing fiber 200 may be impregnated into the resin core 100 when the resin core 100 is melted by heat or a solvent.

Preferably, the resin core may be formed in a plate-shape.

The guide protrusions 110 may be provided by protruding along the edge of the resin core 100 as being spaced apart at a predetermined distance from each other and thus, the plurality of guide notches 120 may be formed therebetween.

The resin core 100 may be made of a soluble resin that is melted by an organic solvent or water, or made of a thermoplastic resin that is melted by heat, such as polypropylene, polyethylene and the like, but is not limited thereto.

The reinforcing fiber 200 may be wound over the plurality of guide notches 120, which function as a guide for the reinforcing fiber. Here, the reinforcing fiber 200 may be regularly wound around the resin core 100 under the guide of the guide notches 120. The reinforcing fiber 200 may be a carbon fiber, a glass fiber, an aramid fiber, and the like, but is not limited thereto.

When a solvent or heat is applied to the composite layer that is formed by winding the reinforcing fiber 200 around the resin core 100 comprising a solvent-soluble resin or a thermoplastic resin, the reinforcing fiber 200 may be impregnated into the resin core 100 melted by the solvent or heat. For example, when the solvent or heat is applied to the composite layers after arranging a plurality of composite layers in a mold and closing the mold, the resin core 100 may be melted by the solvent or heat so that the reinforcing fiber 200 may be impregnated into the resin core 100. Thus, the composite layer may be molded to correspond to a shape of the mold.

In comparison with an conventional composite layer that is manufactured by laminating sheets of the reinforcing fiber 200, such as UD or NCF sheets, to form a lamination of composite layers via a manual process or by using a laminating machine, the present invention can manufacture a composite layer by winding the reinforcing fiber 200 over the guide notches 120 that are formed in the resin core 100. Thus, the present invention may reduce time and cost for manufacturing the composite layers.

In addition, the present invention can easily manufacture laminated composite layers having the reinforcing fibers 200 wound in different winding directions only by changing the winding direction. Likewise, in the case of changing the thickness of the composite layer, the present invention can easily manufacture the composite layer only by changing the number of windings of the reinforcing fiber 200 per guide notch 120.

Preferably, the edge of the resin core 100 may be a square edge formed by one pair of horizontal sides and one pair of vertical sides extending between opposed ends of the one pair of horizontal sides, and the guide notches 120 provided in the horizontal sides may be formed at corresponding locations to face each other, and the guide notches 120 provided in the vertical sides may be formed at corresponding locations to face each other.

Preferably, the resin core may be formed in a plate-shape and the plate-shaped resin core 100 may be configured to form a square with one pair of horizontal sides and one pair of vertical sides. Thus, the guide notches 120 provided in the one pair of horizontal sides may be formed at corresponding locations to face each other such that a virtual line extending between the guide notches 120 of the horizontal sides may be parallel to the vertical sides. Further, the guide notches 120 provided in the one pair of vertical sides are formed at corresponding locations to face each other such that a virtual line extending between the guide notches 120 of the vertical sides may be parallel to the horizontal sides. Thus, the reinforcing fiber 200 may be wound over the guide notches 120, which function as a guide for the reinforcing fiber 200, in a predetermined direction.

Figure 2:
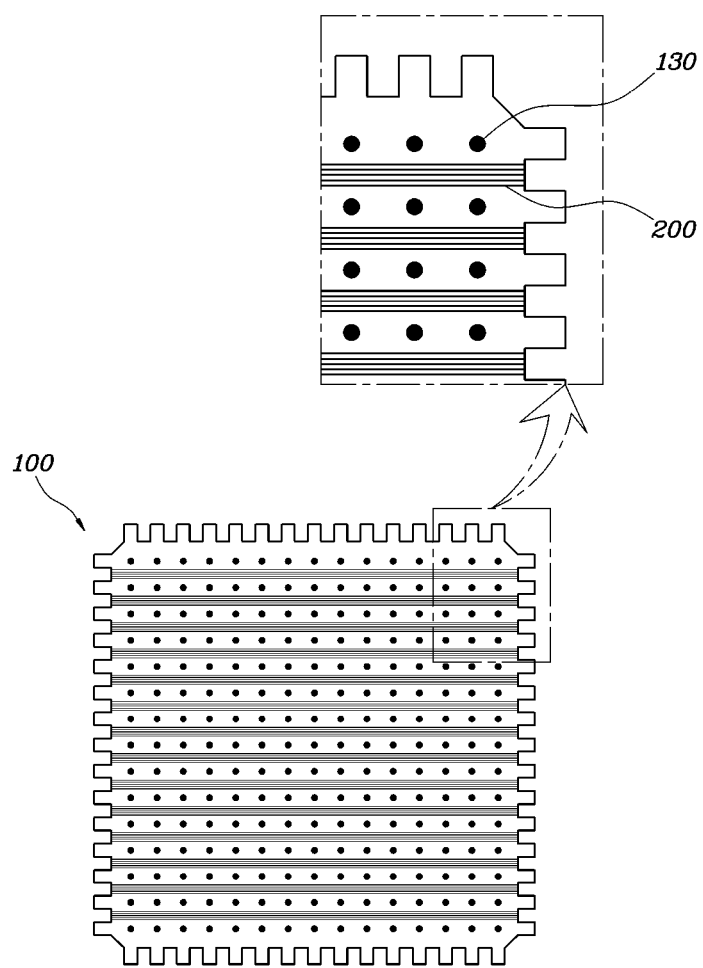
FIG. 2 illustrates an exemplary composite layer according to an exemplary embodiment of the present invention.

As shown in FIG. 2, the reinforcing fiber 200 of the composite layer according to the present invention may include: a first reinforcing fiber 210 wound around the resin core 100 from an upper side to a lower side of the resin core 100 in a direction parallel to the horizontal sides.

When the winding direction of the reinforcing fiber 200 is based on the horizontal sides, the winding direction parallel to the horizontal sides forms an angle of zero degrees relative to the horizontal sides. In order to make the winding direction of the fiber 200 be parallel to the horizontal sides, the reinforcing fiber 200 may be wound over the guide notches 120 formed in the vertical sides. In this case, the reinforcing fiber 200 may be wound over the guide notches 120 of the vertical sides from the upper side to the lower side of the resin core 100. Thus, the composite layer having the reinforcing fiber 200 that is wound in a direction of zero degree relative to the horizontal side may be provided. Here, in order to provide a composite layer having a constant thickness, the same number of windings of the reinforcing fiber 200 may be wound over the guide notches 120.

Moreover, the reinforcing fiber 200 may further include: a second reinforcing fiber 220 wound around the resin core 100 from a first side to a second side of the resin core 100 in a direction parallel to the vertical sides to provide a composite layer having the reinforcing fiber 200 that is wound in directions of zero degrees and 90 degrees.

When the winding direction of the reinforcing fiber 200 is based on the horizontal sides, the winding direction paralleled to the vertical sides forms an angle of 90 degrees relative to the horizontal side. To make the winding direction of the fiber 200 be parallel to the vertical sides, the reinforcing fiber 200 is wound over the guide notches 120 formed in the horizontal sides. In this case, the reinforcing fiber 200 is wound over the guide notches 120 along the horizontal sides from the first side to the second side of the resin core 100. Thus, the composite layer having the reinforcing fiber 200 that is wound in directions of zero degrees and 90 degrees is provided. Here, in order to provide a composite layer having a constant thickness, the same number of windings of the reinforcing fiber 200 may be wound over the guide notches 120.

To provide a composite layer having the reinforcing fiber 200 wound in directions of zero degrees, 90 degrees, and 45 degrees, the reinforcing fiber 200 may further include: a third reinforcing fiber 230 wound around the resin core 100 from a first corner to a second corner of the resin core 100 in a direction parallel to a diagonal line that extends between a third corner and a fourth corner that diagonally face each other.

When the winding direction of the reinforcing fiber 200 is based on the horizontal sides, the winding direction parallel to the diagonal line that extends between the first corner and the second corner of the resin core 100 may form an angle of 45 degrees relative to the horizontal sides. Thus, for example, a composite layer, in which the reinforcing fiber 200 is wound from the third corner to the fourth corner and therefore the reinforcing fiber 200 is wound in directions of zero degrees, 90 degrees, and 45 degrees, may be provided. Here, in order to provide the composite layer having a constant thickness, the same number of windings of the reinforcing fiber 200 may be wound over the guide notches 120.

The reinforcing fiber 200 may further include: a fourth reinforcing fiber 240 wound around from the third corner to the fourth corner of the resin core 100 in a direction parallel to a diagonal line that extends between the first corner and the second corner to provide a composite layer having the reinforcing fiber 200 in directions of zero degrees, 90 degrees, 45 degrees, and −45 degrees.

When the winding direction of the reinforcing fiber 200 is based on the horizontal sides, the winding direction parallel to the diagonal line that extends between the third corner and the second corner of the resin core 100 may form an angle of −45 degrees relative to the horizontal sides. Thus, for example, a composite layer, in which the reinforcing fiber 200 is wound from the first corner to the second corner, and therefore the reinforcing fiber 200 is wound in directions of zero degrees, 90 degrees, 45 degrees, and −45 degrees, may be provided. Here, in order to provide the composite layer having a constant thickness, the same number of windings of the reinforcing fiber 200 may be wound over the guide notches 120.

Figure 3:
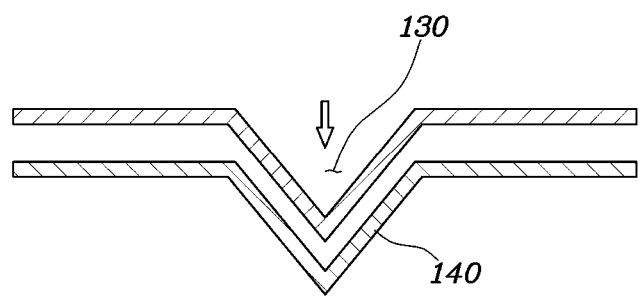
FIG. 3 illustrates an exemplary composite layer according to an exemplary embodiment of the present invention.
Figure 4A:
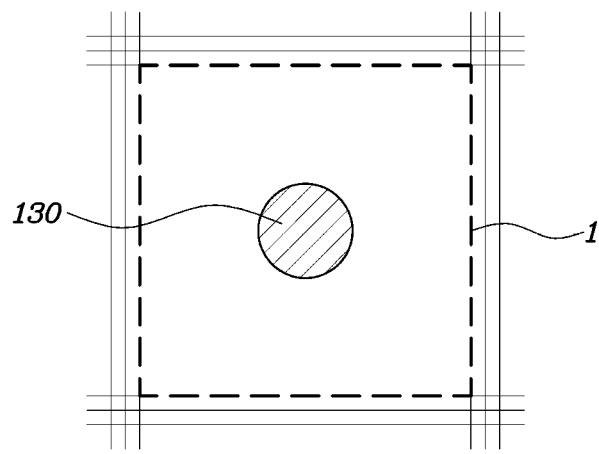
FIG. 4A illustrates an exemplary coupling indentation provided between reinforcing fibers according to an exemplary embodiment of the present invention.
Figure 4B:
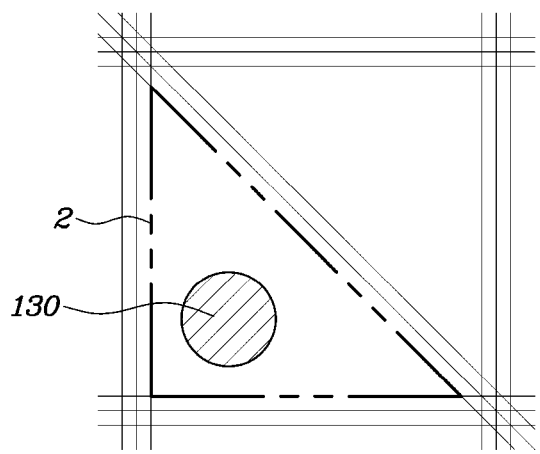
FIG. 4B illustrates an exemplary coupling indentation provided between reinforcing fibers according to an exemplary embodiment of the present invention.
Figure 4C:
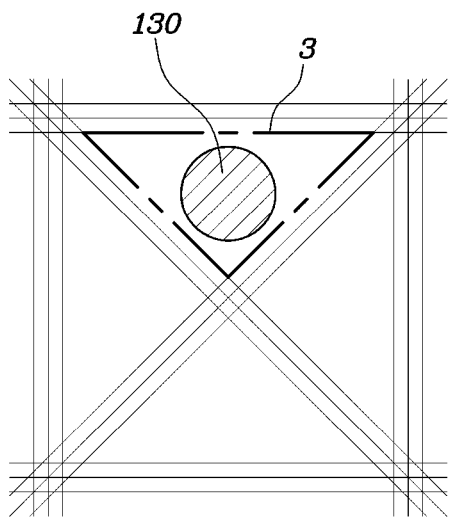
FIG. 4C illustrates an exemplary coupling indentation provided between reinforcing fibers according to an exemplary embodiment of the present invention.
Figure 5:
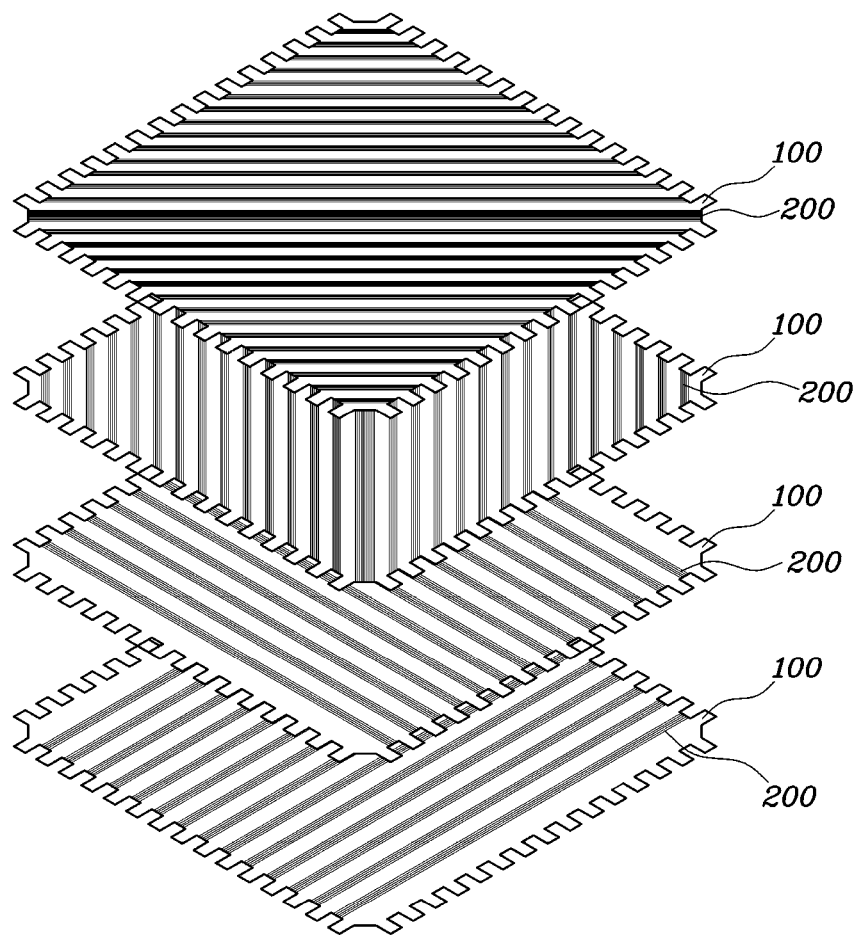
FIG. 5 illustrates an exemplary coupling indentation and a coupling protrusion according to an exemplary embodiment of the present invention.

As shown in FIGS. 3 to 5, a coupling indentation 130 and a coupling protrusion 140 may be respectively formed on an upper surface and a lower surface of the resin core 100 by indenting the upper surface of the resin core 100 downwardly and by protruding the lower surface of the core 100 as much as the upper surface of the resin core 100.

In other words, to minimize scattering of the plurality of composite layers that may occur when molding the laminated composite layers and to prevent the composite layers from moving when injecting resin into a mold in an injection molding process, the coupling indentation 130 may be formed on the upper surface by indenting the upper surface of the resin core 100 downwardly and the coupling protrusion 140 may be formed on the lower surface by protruding from the lower surface of the resin core 100.

Accordingly, as shown in FIGS. 4A, 4B, and 4C, when laminating the plurality of composite layers, the coupling indentation 130 of a composite layer is engaged with the coupling protrusion 140 of an upper composite layer, and the coupling protrusion 140 of the composite layer is engaged with the coupling indentation 130 formed on a lower composite layer, thereby coupling the composite layers to each other.

Meanwhile, the coupling indentation 130 and the coupling protrusion 140 are provided at a location, at which the coupling indentation 130 and the coupling protrusion 140 can avoid interference with the reinforcing fiber 200. Thus, the plurality of composite layers is laminated to form a lamination regardless of presence of the reinforcing fiber 200.

For example, as shown in FIG. 4A, when a square-shaped resin core 100 has the reinforcing fiber 200 that is wound around the resin core 100 in directions of zero degrees and 90 degrees, a square 1 may be formed between the reinforcing fiber 200 wound in a direction of zero degrees and the reinforcing fiber 200 wound in a direction of 90 degrees. Thus, since the square 1 may avoid interference with the reinforcing fiber 200, in which the coupling notch 130 and the coupling notch 140 are formed, the plurality of composite layers may be coupled to each other regardless of presence of the reinforcing fiber 200.

In addition, as shown in FIG. 4B, when of the square-shaped resin core 100 may have the reinforcing fiber 200 that is wound around the resin core 100 in directions of zero degrees, 90 degrees, and 45 degrees, a right triangle 2 formed by dividing the square 1 into two equal parts may be defined among the reinforcing fiber 200 wound in a direction of zero degrees, the reinforcing fiber 200 wound in a direction of 90 degrees, and the reinforcing fiber 200 wound in a direction of 45 degrees. Thus, since the right angle 2 may avoid interference with the reinforcing fiber 200, in which the coupling indentation 130 and the coupling protrusion 140 may be formed, the plurality of composite layers may be coupled to each other regardless of presence of the reinforcing fiber 200.

Furthermore, as shown in FIG. 4C, when the square-shaped resin core 100 may have the reinforcing fiber 200 that is wound around the resin core 100 in directions of zero degrees, 90 degrees, 45 degrees, and −45 degrees, an isosceles triangle 3 formed by dividing the right triangle 2 into two equal parts may be defined among the reinforcing fiber 200 wound in a direction of zero degrees, the reinforcing fiber 200 wound in a direction of 90 degrees, the reinforcing fiber 200 wound in a direction of 45 degrees, and the reinforcing fiber 200 wound in a direction of −45 degrees. Thus, the isosceles triangle 3 may avoid interference with the reinforcing fiber 200, in which the coupling indentation 130 and the coupling protrusion 140 may be formed, and the plurality of composite layers may be coupled to each other regardless of presence of the reinforcing fiber 200.

Figure 6:
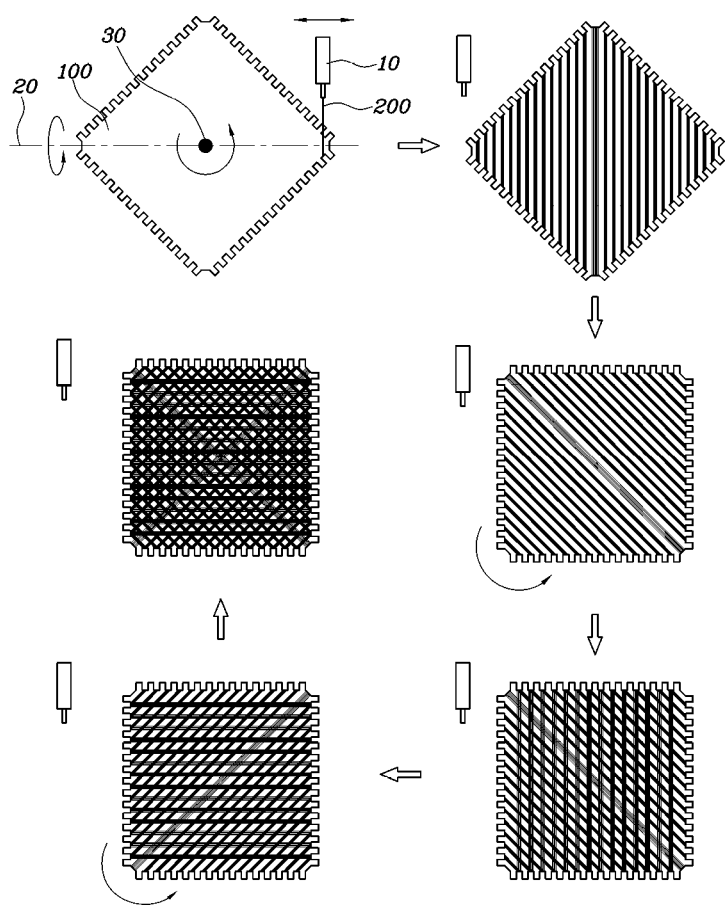
FIG. 6 illustrates an exemplary process of manufacturing an exemplary composite layer according to an exemplary embodiment of the present invention.

As shown in FIG. 6, according to another embodiment, the present invention provides a method of manufacturing a composite layer, the method including: preparing a plate-shaped resin core 100 made of resin that is melted by heat or a solvent, with guide protrusions 110 protruding along an edge of the resin core 100 while being spaced apart from each other to form a plurality of guide notches 120 therebetween that function as a guide for a reinforcing fiber 200; winding a reinforcing fiber 200 firstly around the resin core 100 via the plurality of guide notches 120 in a first direction; and winding the reinforcing fiber 200 secondarily around the resin core 100 in a second direction after rotating the resin core 100 at a predetermined angle, the resin core 100 having the reinforcing fiber 200 that is wound around the resin core 100 in the first direction.

The plate-shaped resin core 100 may suitably comprise the guide protrusions 110 that are formed by protruding along the edge of the resin core 100 while being spaced apart from each other at a predetermined distance and the plurality of guide notches 120 therebetween. The resin core 100 may be made of resin that is melted by heat or the solvent. In the first winding step followed by the resin core preparation step, the resin core 100 may be placed on a robot 10 that automatically may rotate the resin core 100 in a direction of X-axis 20 and wind the reinforcing fiber 200 supplied from the robot 10 over the guide notches 120 in a predetermined direction.

In the second winding step followed by the first winding step, the robot 10 may rotate the resin core 100 in a direction of Y-axis 30 at a predetermined angle to change the winding direction, then rotate the resin core 100 in a direction of X-axis 20 and wind the reinforcing fiber 200 supplied from the robot 10 over the guide notches 120 in a predetermined direction. For example, preferably, the robot 10 may rotate the resin core 100 at an angle of 45 degrees in a direction of Y-axis 30 to form a 45 degrees angle between the reinforcing fiber 200 of the first winding step and the reinforcing fiber 200 of the second winding step. Thus, the present invention may provide a method of manufacturing a composite layer having the reinforcing fiber 200 that may be wound in directions of 45 degrees and zero degrees.

Subsequently, the robot 10 may rotate the resin core 100 at an angle of 90 degrees in a direction of Y-axis 30, and then rotates the resin core 100 in a direction of X-axis 20 and winds the reinforcing fiber 200 supplied from the robot 10 over the guide notches 120 in a predetermined direction. Thus, a composite layer having the reinforcing fiber 200 that is wound in directions of zero degrees, 45 degrees, and 90 degrees may be manufactured.

Figure 7:
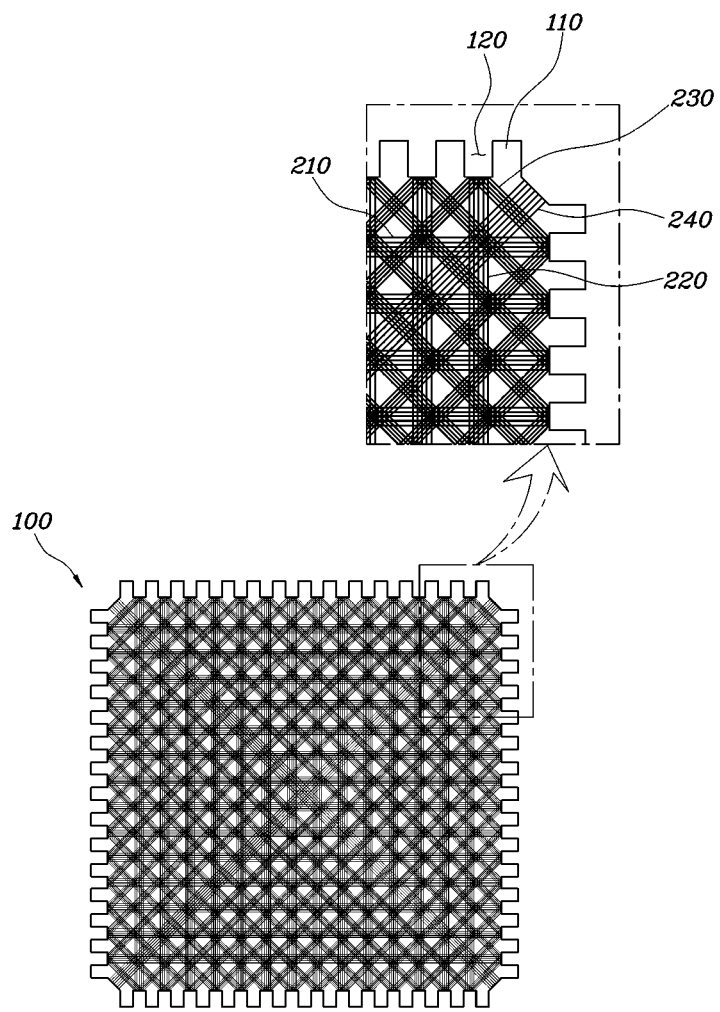
FIG. 7 illustrates exemplary composite layers be laminated to form a composite layer lamination according to an exemplary embodiment of the present invention.

As shown in FIG. 7, according to a further embodiment, the present invention provides a composite layer lamination including: a plurality of composite layers laminated in multiple layers. In particular, each of the composite layers may include a plate-shaped resin core 100 comprising guide protrusions 110 protruding along an edge of the resin core 100 as being spaced apart at a predetermined distance from each other and a plurality of guide notches 120 formed therebetween; and a reinforcing fiber 200 wound around the resin core 100 via the plurality of guide notches 120 that function as a guide for the reinforcing fiber 200. Preferably, the resin core may be melted by heat or a solvent such that the reinforcing fiber 200 wound over the guide notches 120 may be impregnated or formed in the resin core 100.

Preferably, the reinforcing fiber 200 of a first composite layer that is the lowest one of the composite layers may be wound in a direction parallel to facing sides of the edge of the resin core 100, the reinforcing fiber 200 of a second composite layer laminated on the first composite layer may be wound in a direction perpendicular to the reinforcing fiber 200 of the first composite layer, the reinforcing fiber 200 of a third composite layer laminated on the second composite layer may be wound in a direction of 45 degrees to the reinforcing fiber 200 of the second composite layer, and the reinforcing fiber 200 of a fourth composite layer laminated on the third composite layer may be wound in a direction perpendicular to the reinforcing fiber 200 of the third composite layer.

In addition, each of the composite layers may comprise a coupling indentation 130 and a coupling protrusion 140 that may be respectively formed on the upper surface and the lower surface of the resin core 100 by indenting the upper surface of the resin core 100 downwardly and by protruding the lower surface of the resin core 100 as much as the upper surface of the resin core 100. Preferably, the coupling indentation 130 and the coupling protrusion may be formed at a location at which the coupling indentation 130 and the coupling protrusion 140 may avoid interference with the reinforcing fiber 200, and then, the coupling protrusion 140 of an upper laminated composite layer may be coupled with the coupling indentation 130 of a lower laminated composite layer. Thus, the present invention may minimize dislocation of the composite layers that may occur when molding laminated composite layers and may prevent the composite layers from moving when injecting resin into a mold in an injection molding process.

Although various exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A composite layer, comprising:
a resin core comprising a plurality of guide protrusions protruding along an edge of the resin core wherein the guide protrusions are spaced apart at a predetermined distance from each other and a plurality of guide notches formed between the plurality of the guide protrusions; and
a reinforcing fiber wound around the resin core via the plurality of guide notches that function as a guide for the reinforcing fiber,
wherein the reinforcing fiber is impregnated into the resin core when the resin core is melted by heat or a solvent.

2. The composite layer of claim 1, wherein the resin core is formed in a plate-shape.

3. The composite layer of claim 1, wherein the edge of the resin core is a square edge formed by one pair of horizontal sides and one pair of vertical sides extending between opposed ends of the one pair of horizontal sides, and the guide notches provided in the horizontal sides are formed at corresponding locations to face each other, and the guide notches provided in the vertical sides are formed at corresponding locations to face each other.

4. The composite layer of claim 3, wherein the reinforcing fiber comprises:
a first reinforcing fiber wound around the resin core from an upper side to a lower side of the resin core in a direction parallel to the horizontal sides.

5. The composite layer of claim 4, wherein the reinforcing fiber further comprises:
a second reinforcing fiber wound around the resin core from a first side to a second side of the resin core in a direction parallel to the vertical sides.

6. The composite layer of claim 5, wherein the reinforcing fiber further comprises:
a third reinforcing fiber wound around the resin core from a first corner to a second corner of the resin core in a direction parallel to a diagonal line that extends between a third corner and a fourth corner that diagonally face each other.

7. The composite layer of claim 6, wherein the reinforcing fiber further comprises: a fourth reinforcing fiber wound around from the third corner to the fourth corner of the resin core in a direction parallel to a diagonal line that extends between the first corner and the second corner.

8. The composite layer of claim 1, wherein the composite layer further comprises a coupling indentation and a coupling protrusion that are respectively formed on an upper surface and a lower surface of the resin core by indenting the upper surface of the resin core downwardly and by protruding the lower surface of the resin core as much as the upper surface of the resin core.

9. The composite layer of claim 8, wherein the coupling indentation and the coupling protrusion are provided at a location at which the coupling indentation and the coupling protrusion avoid interference with the reinforcing fiber.

10. A composite layer lamination, comprising:
a plurality of composite layers that are laminated in multiple layers,
wherein each of the composite layers includes: a resin core comprising a plurality of guide protrusions protruding along an edge of the resin core as being spaced apart at a predetermined distance from each other and a plurality of guide notches formed between the plurality of guide protrusions; and a reinforcing fiber wound around the resin core via the plurality of guide notches that function as a guide for the reinforcing fiber.

11. The composite layer lamination of claim 10, wherein the resin core is formed in a plate-shape.

12. The composite layer lamination of claim 10, wherein the reinforcing fiber of a first composite layer that is a lowest one of the composite layers is wound in a direction parallel to facing sides of the edge of the resin core, the reinforcing fiber of a second composite layer laminated on the first composite layer is wound in a direction perpendicular to the reinforcing fiber of the first composite layer, the reinforcing fiber of a third composite layer laminated on the second composite layer is wound in a direction of 45 degrees to the reinforcing fiber of the second composite layer, and the reinforcing fiber of a fourth composite layer laminated on the third composite layer is wound in a direction perpendicular to the reinforcing fiber of the third composite layer.

13. The composite layer lamination of claim 10, wherein each of the composite layers comprises a coupling indentation and a coupling protrusion that are respectively formed on an upper surface and a lower surface of the resin core by indenting the upper surface of the resin core downwardly and by protruding the lower surface of the resin core as much as the upper surface of the resin core at a location at which the coupling indentation and the coupling protrusion avoid interference with the reinforcing fiber, and the coupling protrusion of an upper laminated composite layer is coupled with the coupling indentation of a lower laminated composite layer.

14. A method of manufacturing a composite layer, comprising:
preparing a resin core comprising a plurality of guide protrusions protruding along an edge of the resin core as being spaced apart at a predetermined distance from each other and a plurality of guide notches formed between the plurality of guide protrusions, wherein the plurality of guide notches function as a guide for a reinforcing fiber winding a reinforcing fiber around the resin core via e plurality of guide notches in a first direction; and winding the reinforcing fiber around the resin core in a second direction after rotating the resin core at a predetermined angle, the resin core having the reinforcing fiber that is wound around the resin core in the first direction, wherein the reinforcing fiber is impregnated in the resin core when the resin core is melted by heat or a solvent after.

15. The method of claim 14, wherein the resin core is formed in a plate-shape.

* * * * *